E. J. NEWTON.
AIR BRAKE SYSTEM.
APPLICATION FILED JUNE 27, 1905.
922,318.
Patented May 18, 1909.
2 SHEETS—SHEET 1.
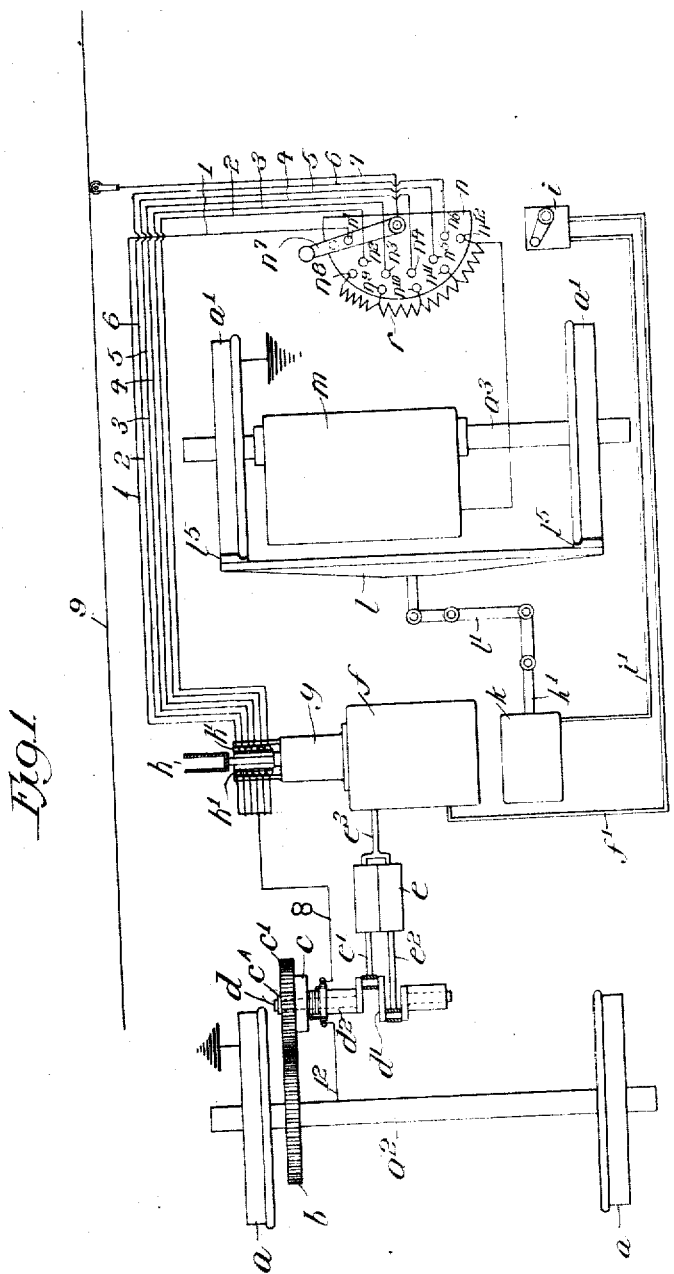
Witnesses
Edw. P. Barnett
Louis B. Erwin
Inventor
Edwin J. Newton
By Rector & Hibben
his Attys E. J. NEWTON.
AIR BRAKE SYSTEM.
APPLICATION FILED JUNE 27, 1905.
922,318.
Patented May 18, 1909.
2 SHEETS—SHEET 2.
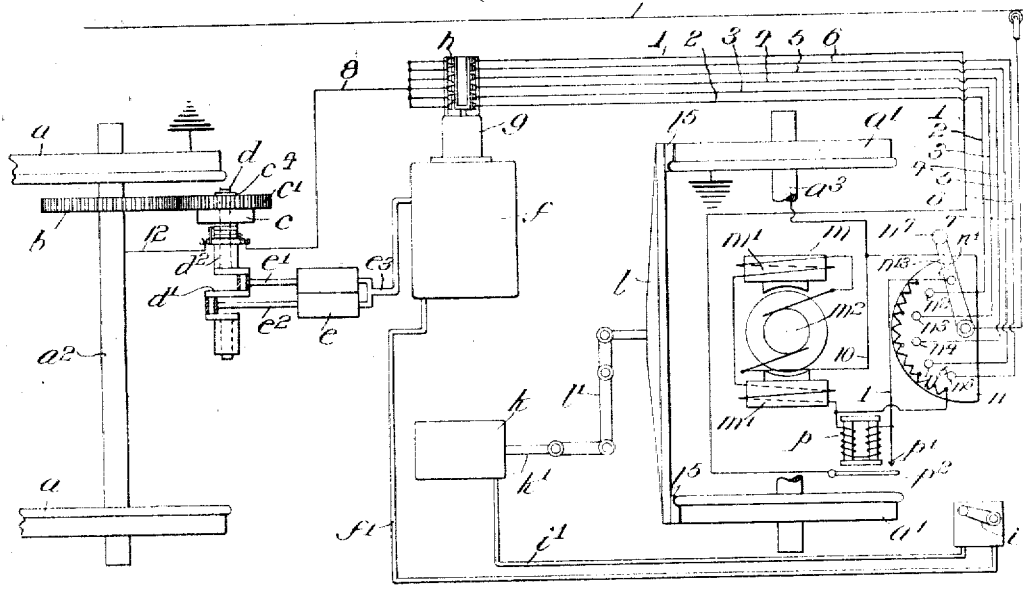
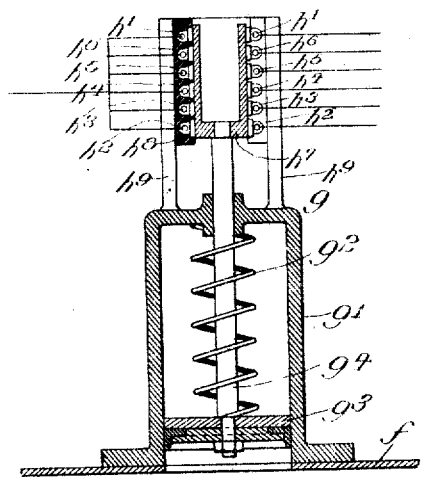
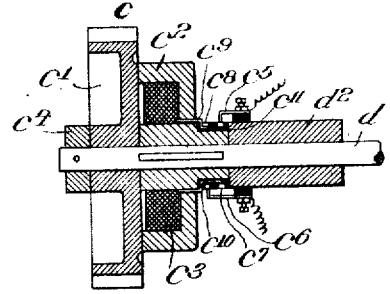
Witnesses:
Edw. P. Barrett
Louis B. Erwin
Inventor
Edwin J. Newton
By Rector
his Attys

UNITED STATES PATENT OFFICE.

EDWIN J. NEWTON, OF CHICAGO, ILLINOIS, ASSIGNOR TO THE AMERICAN ELECTRIC SPECIALTY COMPANY, A CORPORATION OF COLORADO.

AIR-BRAKE SYSTEM.

No. 922,318.  Specification of Letters Patent.  Patented May 18, 1909.

Application filed June 27, 1905. Serial No. 267,177.

*To all whom it may concern:*

Be it known that I, EDWIN J. NEWTON, a citizen of the United States, residing at Chicago, in the county of Cook and State of Illinois, have invented certain new and useful Improvements in Air Brake Systems, of which the following is a specification.

My invention relates generally to apparatus for converting the kinetic energy of a moving object as it comes to rest into potential energy, and utilizing the potential energy for any desired purpose; and it is concerned more particularly with, converting and storing up the kinetic energy of a moving vehicle, and in utilizing the stored up energy for operating mechanism for assisting in arresting the movement of the vehicle.

It is well known that more energy is required to start a vehicle than is required to keep it moving, under the same conditions of load, after it is once under way, the cause being that the inertia of the vehicle has to be overcome in starting it. This force is present in the moving vehicle, in the form of kinetic energy, and must be overcome when it is desired to bring the vehicle to rest. It is the present practice, in systems of vehicle propulsion, to use additional energy from the source which is employed for driving the vehicle to bring it to rest.

One object of my invention is to employ the energy present in the moving vehicle for operating the brake mechanism employed to stop it, and thus avoid the unnecessary expenditure of energy of the present systems.

In its preferred form my invention comprehends energy converting and storing mechanism automatically made operative, when the motive power is withdrawn from a moving part or vehicle, to compress air or other fluid, and mechanism, as fluid pressure brake mechanism, operated by the compressed air or fluid. The energy converting and storing mechanism is normally disconnected from the running gear of the vehicle, but is adapted to be connected therewith by means of a clutch, preferably of the magnetically actuated variety, which is governed by the same controller that controls the electric motor that drives the vehicle, the arrangement preferably being such that when the controller is moved to interrupt the circuit of the motor, it closes the circuit of the clutch and thus throws the energy converting and storing mechanism into gear, this mechanism being disconnected when the controller is moved to make the driving motor operative. With this organization I preferably associate a circuit controlling switch actuated by change of pressure in the reservoir which receives the converted energy, or fluid under pressure, this switch being arranged automatically to place the clutch under the control of the motor controller in its off position when the pressure in the reservoir falls to a certain predetermined point. This idea may be further extended to include an arrangement wherein, as explained hereinafter, the switch successively puts the clutch under the control of the motor controller in certain of its "on" or operating positions as well as in its "off" position.

In the accompanying drawings I have illustrated certain of the forms in which my invention may be embodied.

Figure 1 is a diagrammatic illustration of the running mechanism of an electrically propelled vehicle or car equipped in accordance with my invention. Fig. 2 is a like illustration of vehicle or car with a somewhat modified arrangement. Fig. 3 is a view, partly in cross section, of a pressure actuated switch which I prefer to employ in connection with the system of my invention; and Fig. 4 is a sectional view of a form of magnetic clutch which may be conveniently used in my system.

In the drawings, the same parts, wherever shown, are designated by like reference characters.

In the accompanying drawings, I have illustrated my invention as being applied to an electrically propelled vehicle such as an ordinary street car. The wheels of the car $a$ $a$ and $a'$ $a'$ are shown in pairs on the axles $a^2$ and $a^3$, respectively. The wheels, as illustrated, are of the usual flanged type, and are adapted to run on metal rails which, in accordance with the usual practice, may be connected with the earth or return portion of the electrical circuit employed in supplying energy for propelling the car. In the present instance the wheels $a$ $a$ have keyed to their axle $a^2$ a gear $b$ which is caused to mesh with a pinion $c^1$ mounted loosely on a crank shaft $d$ connected with an air compressor $e$. The pinion $c^1$, as illustrated in Fig. 4, is arranged to form one element of a magnetic clutch $c$, the other element $c^2$ being keyed or otherwise secured to the crank shaft. The magnetic clutch is of a well known form, and comprises, in addition to the elements above referred to, a winding $c^3$, the ends of which are connected by means of conducting straps $c^9$ and $c^{10}$, properly insulated from the metallic portions of the clutch, with the contact rings $c^7$ and $c^8$, respectively. The contact rings are supported on a ring of insulating material $c^{11}$, and are constantly engaged by the contact brushes $c^5$ and $c^6$, respectively, through which current from the electric circuit for the operation of the clutch is led. The contact brushes are mounted upon and insulated from one of the bearings $d^2$ of the crank shaft.

The crank shaft is provided with a double crank arm $d^1$, to which are journaled, in the present instance, the two connecting rods $e^1$ and $e^2$ of a fluid or air compressor $e$. The compressed fluid is led from the compressor $e$ to a reservoir $f$ by way of the pipe $e^3$. This reservoir $f$ is adapted to contain the compressed fluid for the operation of the brake mechanism, the fluid being led from the reservoir through the motorman's valve $i$ to the brake cylinder $k$ by way of the pipes $f^1$ and $i^1$. The brake cylinder $k$ may actuate the brake mechanism in any convenient manner, as by means of the brake shoes $l^5$ $l^5$ carried on the brake beam $l$, connected with the piston of the brake cylinder by lever $l^1$. In the present instance the brake shoes $l^5$ $l^5$ are shown as engaging the wheels $a^1$ $a^1$ to the axle $a^2$ of which the motor $m$ is connected; but it will be understood that the brake might be made to engage the other wheels $a$ $a$, or any other convenient portion of the running gear of the car.

With the reservoir $f$ I have associated a pressure operated switch $h$, the office of which will hereinafter be explained. This switch, as illustrated in Fig. 3 comprises, in the present instance, a number of pairs of contacts $h^1$, $h^2$, $h^3$, $h^4$, $h^5$, and $h^6$, mounted on insulating strip $h^8$ supported by uprights $h^9$ carried on the casing $g^1$ of the switch operating cylinder $g$. The contacts are mounted in two series with the engaging faces in parallel planes, and between the two series is placed a metallic bridging member $h^7$ which is adapted to move lengthwise of the contacts to complete the electrical circuits between successive pairs of contacts. The bridging member may be, as shown, U-shaped, and so arranged that as it bridges successive pairs of contacts it maintains closed the circuits that it has completed between previously bridged pairs. This U-shaped bridging member is carried on the end of the piston rod $g^4$ the other end of which is provided with a piston head $g^3$ adapted to move within the cylinder $g$. The piston head $g^3$ is provided with the customary packing and follower ring, and between the piston head and the closed end of the cylinder is a compression spring $g^2$ which tends to thrust the head toward the other end of the cylinder so as to move the bridging member into a position where it will complete the electrical circuits of all the pairs of contacts. As the pressure in the reservoir $f$, with which the switch actuating cylinder $g$ is in communication, rises, the piston thrusts the bridging member $h^7$ successively from the pairs of contacts until, when the pressure reaches a predetermined value, the bridging member has been thrust from between and opened the circuits of all of the pairs.

As described and illustrated in the accompanying drawings, the clutch which I have preferred to employ to connect the running gear of the vehicle or car with the fluid compressor is an electro-magnetically actuated clutch, and consequently requires for its operation a system of electric circuits which I shall now describe.

The controller $n$ of the car is preferably provided with a series of contact points in addition to the contacts through which the circuits of the propelling motor of the car are controlled. These contacts are illustrated at $n^1$, $n^2$, $n^3$, $n^4$, $n^5$, and $n^6$ of the drawings, arranged in the arc of a circle on the top of the controller, and adapted to be contacted by the arm of the controller as it is moved from one to another of its positions. The motor circuit contacts of the controller are shown in Fig. 1 as another concentric series of contacts designated $n^8$, $n^9$, $n^{10}$, $n^{11}$, and $n^{12}$, and are illustrated as including between them a series of resistances $r$, which are arranged to be successively cut out of circuit as the controller arm is moved from left to right in a counter clockwise direction, to increase the current flow through and the speed of the motor. It will be understood, however, that any convenient method of controlling the circuits of the motor may be employed, as this feature forms no part of my invention. It will also be understood that the illustration of the various contact points of the controller as being located on the top thereof, and in position to be directly contacted by the controller arm, is merely diagrammatic, and that, in accordance with the usual practice, these contacts may be arranged within the casing of the controller.

Each of the clutch circuit contacts $n^1$, $n^2$, $n^3$, $n^4$, $n^5$, and $n^6$ on the controller is connected by way of conductors 1, 2, 3, 4, 5 and 6, respectively, with the corresponding one of the pairs of contacts $h^1$, $h^2$, $h^3$, $h^4$, $h^5$, and $h^6$, respectively, on the pressure actuated switch $h$, the remaining contacts of the pairs being connected to a common conductor 8 which leads to one brush and contact ring of the magnetic clutch $c$, through the winding of the magnetic clutch, out by way of the other contact ring and brush, and thence to earth or the return conductor by way of the metallic running gear of the car in contact with the rail. The controller arm, which engages the clutch contacts and motor contacts as it passes over them, is illustrated as being connected with the trolley wire 9 by way of conductor 7, so that as it sweeps over the contacts in being moved from one position to another, it closes first one and then another of the alternative branches of the clutch circuit, putting each in turn in condition to conduct current to the clutch, subject to the control of the pressure switch $h$.

The operation of my system, in the form illustrated in Fig. 1, is as follows: Assume that the car is running, and that the controller arm is thrown as far as it will go in a counter clock-wise position; that is, so that it rests upon and makes contact with contact points $n^6$ and $n^{12}$, thus allowing the current from the trolley or supply conductor 9 to flow in its full force to the motor $m$. Also assume that the pressure of the fluid in reservoir $f$ is sufficient to move the piston head $g^3$ against compression spring $g^2$ far enough to thrust the bridging member $h^7$ beyond the last pair of contacts $h^1$, as shown in Fig. 1, thus opening all of the branches of the circuit of the magnetic clutch. When the motorman wishes to bring the car to a stop, he throws the controller arm as far as it will go in a clock-wise position,—that is, to the point where, as shown in the drawings, it rests upon contact $n^1$—thus cutting off the flow of current to the motor; and then moves the air valve $i$ into position to permit the air or fluid under pressure to flow by way of pipes $f^1$ and $i^1$ from the reservoir $f$ to the brake cylinder $k$. The entrance of the compressed fluid into the cylinder $k$ causes it to draw in its piston, which movement is communicated by way of piston rod $k^1$ and lever $l^1$ to the brake beam $l$, which thrusts the brake shoes $l^5$ carried at its ends against the wheels. But the flow of compressed fluid from the reservoir $f$ to operate the brake causes an immediate reduction of pressure in the reservoir, and the result is that the compression spring $g^2$ in the switch actuating cylinder $g$ forces the piston head $g^3$ down until the pressure of the spring and the pressure in the reservoir again balance each other. If the reduction of pressure has been sufficient, the bridging member $h^7$ of the switch will be moved far enough toward the cylinder to be interposed between the first pair of contacts $h^1$, and thus close the branch of the clutch circuit that includes the conductor 1 and contact $n^1$. As the controller arm has been moved to the position where it rests on contact $n^1$ the circuit of the magnetic clutch is completed from the trolley or supply conductor 9 to earth by way of conductor 7, the controller arm, contact $n^1$ which it engages, conductor 1, switch contacts $h^1$, and conductors 8 and 12, and the clutch is immediately actuated to connect the compressor $e$ with the running gear of the car by way of the connecting rods $e^1$ and $e^2$, the crank shaft $d$, the magnetic clutch $c$, the pinion $c^1$, and the gear $b$ with which it meshes. It follows that if the pressure in the reservoir $f$ is low enough to allow the bridging member of the switch to be interposed between contacts $h^1$, or if the pressure is reduced to that point in the initial act of stopping the car, the clutch will be actuated to operatively connect the compressor with the running gear of the car by the same movement of the controller handle that disconnects, or renders inoperative, the motor that propels the car. In this way the kinetic energy of the moving car, as it comes to rest, serves to drive the compressor, which, in turn, compresses the fluid which is employed in actuating the mechanism that arrests the movement of the car.

It sometimes happens, however, that under certain conditions the kinetic energy made available as the car comes to rest is not sufficient to store up all the power that is necessary for the operation of the brake mechanism. For instance, it may be that the car is being run at a comparatively slow speed, and is being stopped frequently, as might be the case where it is proceeding through the streets of a city. In this case considerably more energy is used for the operation of the brake mechanism in stopping the car, than is supplied by the kinetic energy of the car in coming to rest, and it is necessary to provide from another source sufficient compressed fluid or power in other form to make up the deficiency. To provide for such conditions, I have arranged my system so that the energy available for operating the compressor in the stopping of the car may be automatically supplemented by energy supplied directly from the propelling motor. This, in the present instance, I accomplish by providing a number of branches of the magnetic clutch circuit controlled jointly by the pressure switch $h$, and the controller $m$, the arrangement being such that as the pressure in the reservoir $f$ falls, the branch circuits are successively closed to place the clutch mechanism successively under the control of the controller arm in its various on or running positions; the order preferably being such that a fall of pressure below the point where the clutch is made operative when the controller is in its off position, will cause a closure of the branch completed by the controller arm in its highest speed running position; a further fall of pressure resulting in the closure of the branch completed when the controller arm is in its fifth or next to the highest speed position; a still further fall closing a branch through which the clutch is actuated when the controller arm is in its fourth position; and so on, the continued fall of pressure placing the clutch mechanism under the control of the controller in successively lower running positions. Thus, in the modification illustrated in Figs. 1 and 2, all the circuits of the clutch mechanism are interrupted when the pressure is sufficiently high to thrust the bridging member beyond the first pair of contacts; when it falls sufficiently to bring the bridging member between the first pair, $h^1$ the clutch is made effective only when the controller is in its off position, and consequently the compressor is operated only by the kinetic energy of the car; when it falls to the point where contacts $h^6$ are bridged, the clutch is actuated not only when the controller is in its off position, but also when its arm rests on contact $n^6$ in its highest running position; when the pressure falls sufficiently to bridge contacts $h^5$ the clutch is actuated on positions $n^5$ and $n^6$ of the controller as well as on the off position; when it falls sufficiently to bridge contacts $h^4$ the clutch is actuated in the off position, and in positions $n^4$, $n^5$ and $n^6$ of the controller; and so on, until when the pressure is so low that all the contacts are bridged, the compressor is actuated by the kinetic energy of the car when the controller is in its off position, and also by the motor in all the running positions of the controller.

The arrangement of the branch circuits of the clutch so that they will be closed, first, in the off position of the controller, and then in succession from the highest to the lowest position of the controller as the pressure falls, is so that the supply of energy for operating the brake mechanism will be derived primarily from the kinetic energy of the car; and, if that is insufficient, then from the motor when the car has attained, and is running at, its highest rate of speed, and successively at its lower speeds as the pressure falls; and only from the motor at its lowest speed under conditions of abnormally low pressure in the reservoir. In this way, if the kinetic energy of the car alone is sufficient to supply energy necessary for the operation of the mechanism, it is possible to supplement it without imposing the drag of operating the compressor upon the motor at the time when it is doing its heaviest work in the acceleration of the car.

In the modification illustrated in Fig. 2 I have shown an arrangement generally similar to that of Fig. 1, with the addition of a certain feature having to do with the control of the current used for the actuation of the magnetic clutch. As illustrated in Fig. 1, the circuit of the clutch is closed constantly when the controller is in its off position and the pressure in the reservoir $f$ is such that contacts $h^1$ are bridged, the result being that current flows continuously through the clutch magnet. If the winding of the magnetic clutch is properly proportioned, this flow of current may be comparatively slight, and in no way detrimental to the operation of the system; but if it is desired, for any reason, to prevent this flow of current when the car comes to a standstill, it may be done by employing an arrangement such as I have illustrated in Fig. 2. In this I provide, in addition to an organization such as described in the foregoing, an electro-magnet or relay $p$ having an armature $p^2$ and coöperating contact $p^1$ controlling the conductor 1, which extends from contact $h'$ of the pressure switch to the contact $n^1$ of the controller. The winding of this electro-magnet may be included, as shown, in a local circuit closed through an insulated portion of the controller arm between contacts $n^1$ and $n^{13}$, it being understood that the mechanical arrangement of the contacts is such that when the arm 7 is in its off position the local circuit referred to is completed through conductor 10, the armature $m^2$ of the motor, the field coils $m^1$, the windings of the relay $p$, and a portion of conductor 1, and is out of electrical connection with the supply wire, whereas in the various running positions of the controller the motor branch of the circuit is completed from the supply wire through the controller arm, rheostat connections, motor, and conductor 10 to ground. With this arrangement, when the controller is moved to its off position the local circuit referred to is closed, and the motor, driven by the car and acting as a generator, causes current to circulate in the winding of relay $p$, which draws up its armature, and thus completes the circuit of the magnetic clutch by way of switch contacts $h^1$, conductor 1, and contact $h^1$, through the controller arm to the supply wire. But as soon as the car comes to a standstill the armature ceases to revolve and generate current, and in consequence relay $p$ is deënergized, and its armature falling back, opens the circuit of the clutch magnet, thus preventing a continuous flow of current through it.

Although I have described more or less precise forms and details of construction, I do not intend to limit myself thereto, as I contemplate changes in form, proportion of parts, and the substitution of equivalents as circumstances may suggest or render expedient, without departing from the spirit or scope of my invention and claims. For instance, although I have illustrated a particular form of switch, and pressure mechanism for operating it, it will be understood that any one of a great variety of switches and pressure mechanism known to the art would serve my purpose equally well; and that for the particular magnetic clutch which I have illustrated, any one of a number of well known forms might be substituted.

I claim:

1. In a brake control system, the combination with brake mechanism, a moving part which the same is adapted to engage, and means for moving said part, of a reservoir adapted to contain energy for actuating said mechanism, a device for furnishing energy to said reservoir as its supply is depleted, a connection between said device and said moving part, and a controlling device adapted both to make inoperative the means for moving said part, and to make operative the connection between said part and the aforesaid device for furnishing energy to the reservoir.

2. In a brake control system, the combination with a moving part, and means for moving the same, of brake mechanism adapted to arrest the movement of said part, a reservoir containing energy for actuating said brake mechanism, a device adapted to supply energy to said reservoir, and controlling mechanism adapted to make ineffective the aforesaid means for moving said part, and to connect said part with said device for supplying energy to the reservoir, whereby the reservoir is supplied by means of the kinetic energy of said moving part.

3. In a brake control system, the combination with a moving part, and means for moving the same, of fluid pressure brake mechanism adapted to arrest the movement of said part, a reservoir for containing the fluid for actuating said brake mechanism, a device for altering the pressure of the fluid in said reservoir, and a controlling device adapted to make ineffective the aforesaid means for moving said part, and to connect said part with said pressure altering device.

4. In a brake control system, the combination with a moving part, and means for moving said part, of fluid pressure brake mechanism adapted to arrest the movement of said part, a reservoir for containing fluid under pressure for the actuation of said brake mechanism, a fluid compressing device adapted to supply fluid under pressure to said reservoir, and a controlling device adapted to make ineffective the aforesaid means for moving said part, and to connect said part with said fluid compressing device.

5. In a brake control system, the combination with a moving part, and means for moving said part, of brake mechanism adapted to arrest the movement of said part, a reservoir containing energy for actuating said brake mechanism, a device adapted to supply energy to said reservoir, clutch mechanism adapted to connect said device with said moving part, and a controlling device adapted to make ineffective the aforesaid means for moving said part, and to make operative said clutch mechanism to connect said part with the energy supplying device.

6. In a brake control system, the combination with a moving part, and means for moving the same, of fluid pressure brake mechanism adapted to arrest the movement of said part, a reservoir for a fluid under pressure for actuating said brake mechanism, a fluid compressing device adapted to supply fluid under pressure to said reservoir, a connection between said device and said moving part, a magnetic clutch controlling said connection, a controlling device adapted to render ineffective the aforesaid means for moving said part, and a circuit for said magnetic clutch adapted to be closed by said controlling device when the same is moved to render ineffective the aforesaid means for moving said part.

7. In a brake control system, the combination with a vehicle, and an electric motor for moving the same, of brake mechanism for arresting the movement of said vehicle, a device for supplying energy to said brake mechanism for operating the same, electro-magnetically actuated mechanism for controlling said device, circuits for the clutch controlled by the pressure in the reservoir and an electric switch for controlling both said electric motor and said electro-magnetic mechanism.

8. In a brake control system, the combination with a moving part, and an electric motor for moving the same, of brake mechanism adapted to arrest the movement of said part, an operative connection between said part and said brake mechanism, whereby said mechanism is actuated, a magnetic clutch adapted to control said connection, circuits for the clutch controlled by the pressure in the reservoir and an electric controller adapted to control said motor and said magnetic clutch, and alternatively to render one or the other operative.

9. In a brake control system, the combination with a moving part, and an electric motor for moving the same, of brake mechanism adapted to arrest the movement of said part, a reservoir of energy for actuating said brake mechanism, a device for supplying energy to said reservoir, an operative connection between said device and said moving part, a magnetic clutch controlling said connection, an electric circuit for said magnetic clutch controlled by the pressure in the reservoir, an electric controller for said motor, said controller having a contact adapted to close the circuit of said magnetic clutch at one point, and an electric switch device associated with the aforesaid reservoir, and actuated to close the clutch circuit at another point when the energy in said reservoir falls below a predetermined amount.

10. In a brake control system, the combination with a moving part and with the propelling motor of the car or vehicle, of air brake mechanism for arresting the movement of said part, a compressor for supplying compressed air to said brake mechanism, a connection between said compressor and said moving part, an electro-magnetic device adapted to control said connection, an electric circuit for said device, and a switch for controlling said circuit and thereby controlling said device and the motor.

11. In a brake control system, the combination with a moving part and with the propelling motor of the car or vehicle, of brake mechanism adapted to arrest the movement of said part, a device adapted to supply energy for the operation of said brake mechanism, a connection between said device and said moving part, an electro-magnetically actuated device for controlling said connection, an electric circuit therefor, and a switch for controlling said circuit and thereby controlling said device and the motor.

12. The combination with the running gear of a vehicle and with the propelling motor of the car or vehicle, of a brake for said running gear, a device for supplying energy for the operation of said brake, an electro-magnetically controlled connection between said running gear and said energy supplying device, an electric circuit therefor, and a switch controlling said circuit and thereby controlling said device and the motor.

13. The combination with the running gear of a vehicle and with the propelling motor of the car or vehicle, of fluid pressure brake mechanism therefor, a compressor for supplying the fluid under pressure for the operation of said brake mechanism, an electro-magnetically controlled connection between said running gear and said compressor, an electric circuit therefor, and a switch controlling said circuit and thereby controlling said device and the motor.

14. The combination with the running gear of a vehicle, of an electric motor for actuating the same, fluid pressure brake mechanism for said vehicle, a compressor for supplying fluid under pressure for the operation of said brake mechanism, an electro-magnetically controlled connection between said running gear and said compressor, a circuit therefor, controlled by the pressure in the reservoir a controller adapted to control the operation of the aforesaid electric motor, and a switch contact of said controller controlling the circuit of the aforesaid electro-magnetic connection.

15. The combination with the running gear of a vehicle, of an electric motor for operating the same, a circuit therefor, fluid pressure brake mechanism for said running gear, a reservoir containing fluid under pressure for the operation of said brake mechanism, a compressor for said reservoir, a connection between said compressor and said running gear, electro-magnetic mechanism controlling said connection, a circuit for said electro-magnetic mechanism, controlled by the pressure in the reservoir an electric controller adapted to control the circuit of the aforesaid motor and the circuit of said electro-magnetic mechanism, and a switch actuated by change of pressure in the aforesaid reservoir adapted to coöperate with said controller in the control of the circuit of said electro-magnetic mechanism.

16. The combination with the running gear of a vehicle, an electric motor for operating the same, and a circuit for said motor, of fluid pressure brake mechanism for said running gear, a reservoir containing fluid under pressure for the operation of said brake mechanism, a compressor for supplying said reservoir, a connection between said running gear and said compressor, electro-magnetic mechanism controlling said connection, an electric circuit therefor, an electric controller for controlling the circuit of said motor adapted to be moved into on and off positions, a branch of said circuit of said electro-magnetic mechanism closed by the controller in its off position, another branch closed by the controller in its on position, and a switch adapted to close said last mentioned branch at another point, said switch being operated by an abnormal decrease of pressure in said reservoir.

17. The combination with the running gear of a vehicle, an electric motor for operating the same, and a circuit for said motor, of fluid pressure brake mechanism, a reservoir containing fluid under pressure for the operation of said brake mechanism, a compressor for supplying said reservoir, a connection between said running gear and said compressor, electro-magnetic mechanism controlling said connection, an electric circuit therefor, an electric controller for controlling the circuit of said motor adapted to be moved into on and off positions, a branch of said circuit of said electro-magnetic mechanism closed by the controller in its off position, another branch closed by the controller in its on position, a switch controlling each of said branches, and mechanism actuated by change of pressure in said reservoir to operate said switches.

18. The combination with the running gear of a vehicle, an electric motor for operating the same, and a circuit for said motor, of fluid pressure brake mechanism for said running gear, a reservoir containing fluid under pressure for the operation of said brake mechanism, a compressor for supplying said reservoir, a connection between said running gear and said compressor, electromagnetic mechanism controlling said connection, a circuit therefor, an electric controller for controlling the circuit of said motor adapted to be moved into on and off positions, a branch of said circuit of said electro-magnetic mechanism closed by the controller in its off position, another branch closed by the controller in its on position, a switch controlling each of said branches, and mechanism actuated by change of pressure in said reservoir for operating said switches, said mechanism being adapted to close the first mentioned branch upon a predetermined decrease of pressure in said reservoir, and to close the switch controlling the other branch upon a greater or abnormal decrease of pressure in said reservoir.

19. The combination with the running gear of a vehicle, of an electric motor for operating the same, a reservoir for containing fluid under pressure, mechanism adapted to be operated by said fluid, a compressor for said reservoir, an electro-magnetically controlled connection between said compressor and said running gear, an electric circuit therefor controlled by the pressure in the reservoir, and a switch adapted to control said circuit.

20. The combination with the running gear of a vehicle, and an electric motor for operating the same, of a reservoir for containing fluid under pressure, mechanism adapted to be actuated by said fluid, a compressor for said reservoir, a connection between said compressor and said running gear, electro-magnetic mechanism adapted to control said connection, a circuit for said electro-magnetic mechanism, a controller for closing the circuit of the aforesaid electric motor to operate the running gear, and switch contacts controlling the circuit of said electro-magnetic mechanism closed by said controller when it is moved to open the circuit of electric motor, whereby the compressor is automatically connected with said running gear when the motor is disconnected.

21. The combination with the running gear of a vehicle, an electric motor for operating the same, and a circuit for said motor, of fluid pressure brake mechanism for said running gear, a reservoir containing fluid under pressure for the operation of said brake mechanism, a compressor for supplying said reservoir, a connection between said running gear and said compressor, electro-magnetic mechanism controlling said connection, an electric circuit therefor, an electric controller for controlling the circuit of said motor adapted to be moved into on and off positions, a branch of said circuit of said electro-magnetic mechanism closed by the controller in its off position, and another branch closed by the controller in its on position.

22. The combination with the running gear of a vehicle, of a motor for operating the same, a reservoir for containing energy, mechanism adapted to be operated by the energy contained in said reservoir, a device for supplying energy to said reservoir, a connection between said device and said running gear, and controlling mechanism adapted to make the aforesaid motor inoperative and the connection between said device and said running gear operative.

23. The combination with the running gear of a vehicle, of a motor for operating the same, a reservoir for containing energy, mechanism adapted to be operated by the energy contained in said reservoir, a device for supplying energy to said reservoir, a connection between said device and said running gear, controlling mechanism adapted to make the aforesaid motor inoperative and the connection between said device and said running gear operative, and a device responsive to the movement of said vehicle adapted to render said controlling mechanism operative.

24. The combination with the running gear of the vehicle, of an electric motor for operating the same, a reservoir for containing fluid under pressure, mechanism adapted to be operated by said fluid, a compressor for said reservoir, an electro-magnetically controlled connection between said compressor and said running gear, an electric circuit therefor controlled by the pressure in the reservoir, and a switch responsive to the movement of said running gear adapted to control said circuit.

25. The combination with the running gear of a vehicle, of fluid pressure brake mechanism therefor, a compressor for supplying the fluid under pressure for the operation of said brake mechanism, an electro-magnetically controlled connection between said running gear and said compressor, an electric circuit therefor controlled by the pressure in the reservoir, and a switch responsive to the movement of said running gear adapted to control said circuit.

26. The combination with the running gear of a vehicle, of a brake for said running gear, a device for supplying energy for the operation of said brake, an electro-magnetically controlled connection between said running gear and said energy supplying device, an electric circuit therefor, a relay controlling said circuit, an energizing circuit for said relay, and a source of current in said circuit made operative by the movement of said running gear.

27. The combination with a moving part, of an electric motor for moving said part, fluid pressure brake mechanism for arresting the movement of said part, a compressor for supplying the fluid under pressure for the operation of said brake mechanism, an electro-magnetically controlled connection between said moving part and said compressor, a circuit therefor, a controller adapted to control the operation of the aforesaid electric motor, a magnetic switch controlling the circuit of the aforesaid electro-magnetically controlled connection, and a circuit for said electro-magnetic switch including the armature of said electric motor and completed in contacts of said controller.

28. The combination with the running gear of a vehicle, an electric motor for operating the same, and a circuit for said motor, of fluid pressure brake mechanism for said running gear, a reservoir containing fluid under pressure for the operation of said brake mechanism, a compressor for supplying said reservoir, a connection between said running gear and said compressor, electro-magnetic mechanism controlling said connection, an electric circuit therefor, an electric controller for controlling the circuit of said motor adapted to be moved from an off position to a succession of on positions, a number of branches of the circuit of said electro-magnetic mechanism, a branch of said circuit being adapted to be closed by said controller in each of its positions, a switch having a plurality of contact points adapted for successive closures, said contact points being connected with various branches of said circuit, and mechanism for operating said switch controlled by the pressure in said reservoir, the branches of said circuit being so related to the electric controller and the aforesaid switch that as the pressure in said reservoir decreases the branch associated with the off position of the controller is first closed, and then the branches associated with the on positions of the controller, commencing with the position most remote from the off position.

29. In a brake system, the combination with a vehicle, and an electric motor for moving the same, of a controller for controlling said motor, said controller having an off position and a plurality of on positions, of brake mechanism for arresting the movement of said vehicle, mechanism adapted to supply energy for the operation of said brake mechanism, a magnetic clutch adapted to connect said mechanism with the running gear of the vehicle, and a plurality of alternative circuits for said magnetic-clutch associated with said controller, and adapted to be closed alternatively in its various positions.

EDWIN J. NEWTON.

Witnesses:
EDWIN H. SMYTHE,
LOUIS B. ERWIN.